United States Patent [19]

French et al.

[11] Patent Number: 4,924,356
[45] Date of Patent: May 8, 1990

[54] ILLUMINATION SYSTEM FOR A DISPLAY DEVICE

[75] Inventors: Park French, Aurora, Ohio; Wilbur C. Stewart, Hightstown, N.J.

[73] Assignee: General Electric Company, Princeton, N.J.

[21] Appl. No.: 280,842

[22] Filed: Dec. 7, 1988

[51] Int. Cl.$^5$ .............................................. F21V 8/00
[52] U.S. Cl. ...................................... 362/31; 362/293; 362/308; 362/327; 362/223; 362/268; 40/444; 40/546
[58] Field of Search ................. 362/31, 217, 223, 293, 362/327, 268, 326, 346, 308, 309; 350/345; 40/546, 444, 581

[56] References Cited

U.S. PATENT DOCUMENTS

| 3,840,695 | 10/1974 | Fischer | 350/345 |
| 4,263,594 | 4/1981 | Masucci | 350/345 |
| 4,330,813 | 5/1982 | Deutsch | 362/244 |
| 4,668,049 | 5/1987 | Canter et al. | 350/345 |
| 4,686,519 | 8/1987 | Yoshida et al. | 350/345 |
| 4,798,448 | 1/1989 | van Raalte | 350/345 |

FOREIGN PATENT DOCUMENTS

| 0081361 | 6/1983 | European Pat. Off. | 362/247 |
| 0068814 | 3/1988 | Japan | 350/345 |

OTHER PUBLICATIONS

IBM Technical Disclosure Bulletin, vol. 29, No. 11, Apr. 1987 p. 4838.

*Primary Examiner*—Ira S. Lazarus
*Assistant Examiner*—D. M. Cox
*Attorney, Agent, or Firm*—J. S. Tripoli; D. H. Irlbeck; L. L. Hallacher

[57] ABSTRACT

An illumination system for a display device includes a plurality of lenslets which provide partially collimated light with respect to at least one axis of the display. A light box provides uncollimated light to the lenslets. The light box includes a reflector having apertures which transmit light from the light box to the lenslets. The internal surfaces of the light box and the reflector are highly and diffusely reflective and a high percentage of the light reaches the lenslets.

18 Claims, 5 Drawing Sheets

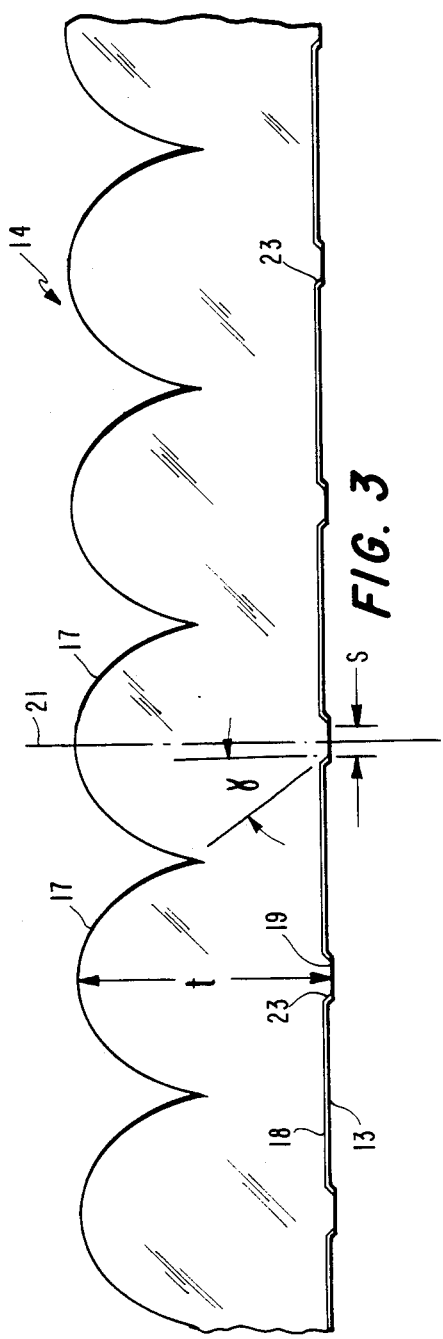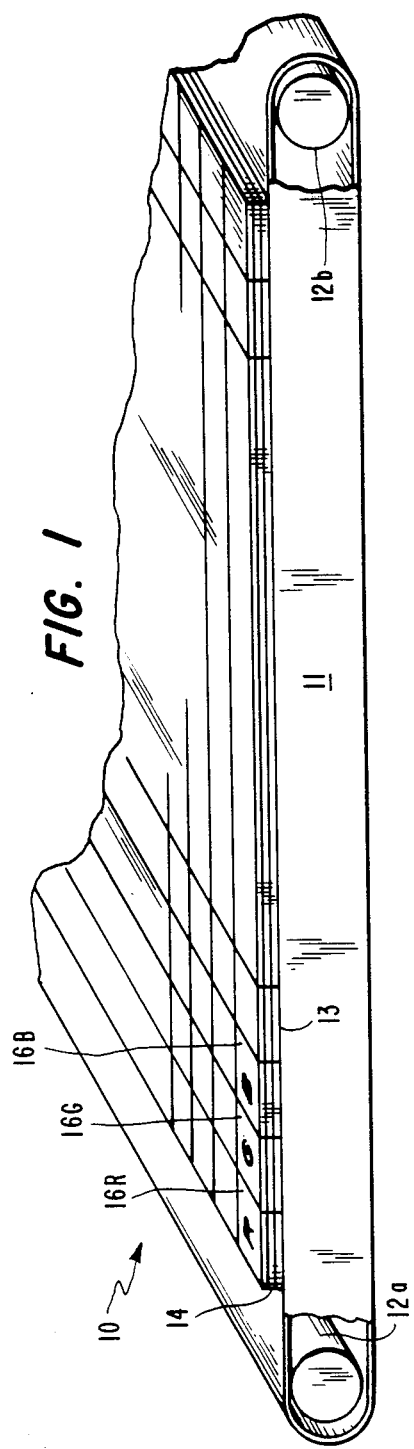

ILLUMINATION SYSTEM FOR A DISPLAY DEVICE

BACKGROUND

This invention relates generally to illumination systems for display devices and particularly to such a system for a liquid crystal display device capable of producing color television pictures.

Liquid crystal display devices used to produce color displays typically require backlighting to achieve the image brightness required for viewing in day light ambient conditions. Existing illumination systems frequently employ a diffuser just before the liquid crystal array in order to smoothe the spatial distribution of light from the lamp. Such a diffuser causes the light entering the liquid crystal array to be spread over a wide range of angles. However, it is known that the contrast of the display can be improved if the angular range of the entering light rays in one azimuth is confined to 15 degrees or less from the perpendicular to the array. There is no restriction for ray components having the orthogonal azimuthal orientation. One existing system uses parabolic reflectors with light sources at the focii of the reflectors to provide partially collimated light. Various lens systems are employed to further control the angles over which the light is incident on the liquid crystal cells. Another scheme for back illuminating the liquid crystal cells of a display device includes a solid light conduit which is illuminated at one end, and which has prisms along a second surface to release the light in a controlled manner to the liquid crystal cells.

In a liquid crystal display device capable of producing a full spectrum of colors, each pixel of the display is composed of a triad of pixel elements. Each of the pixel elements is a liquid crystal cell which transmits one of the primary light colors. The liquid crystal cells themselves do not produce color and accordingly each cell must be associated with a filter of the appropriate light transmission capability. Also, the light provided to the liquid crystal cells must be polarized because of the intrinsic functional characteristics of the liquid crystal cells. A substantial percentage of the illumination, as much as 85%, is lost to the filters and polarizers. Accordingly, the illumination efficiency of liquid crystal display devices is very low and the illumination source is called upon to produce a significantly higher intensity of light than is actually needed to illuminate the display screen. As a result, a very large percentage of the available energy of the display device is consumed by the illumination source. This is a particularly posing disadvantage in portable display devices because it results in a substantial reduction in the lifetime of the power source and, thus, in the viewing time of the display.

For these reasons there is a need for a more efficient illumination system for display devices. The present invention fulfills this long felt need.

SUMMARY

An illumination system for a display device having a plurality of pixels arranged in rows and columns substantially parallel to the axes of the display device includes a plurality of juxtaposed elongated lenslets having a generally elliptical cross section arranged substantially parallel to one of the axes. The lenslets provide light, which is partially collimated along one of the axes, to the pixels. A light box provides uncollimated light to the lenslets. The light box is internally highly and diffusely reflective and houses at least one light source arranged in the proximity of one edge of the light box. The light box includes a light opaque reflector coincident with the lenslets. The reflector includes a plurality of elongated light transmissive slots arranged substantially parallel to the lenslets and centered with respect to the lenslets for individually transmitting uncollimated light from the light box to the lenslets.

BRIEF DESCRIPTION OF THE DRAWINGS

FIG. 1 is a broken away cross section of a simplified showing of a liquid crystal display device incorporating a preferred embodiment.

FIG. 3 is a portion of a second preferred embodiment.

DETAILED DESCRIPTION

Figure 2:
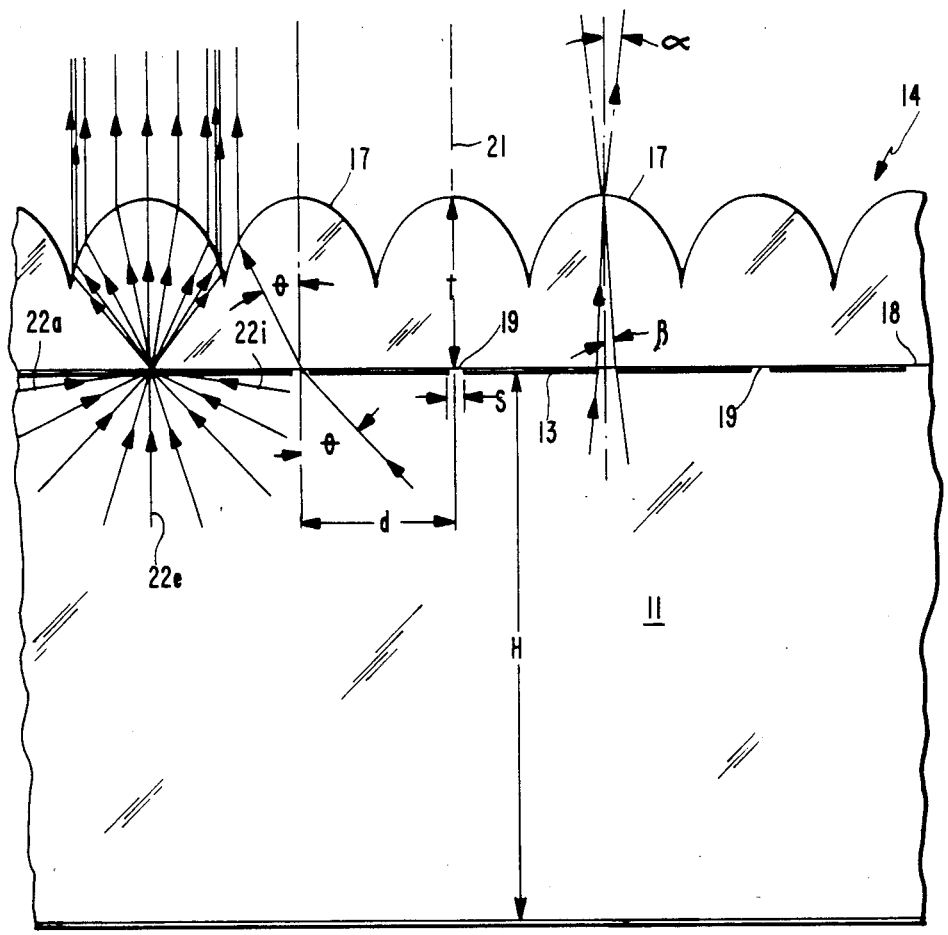
FIG. 2 is a portion of a first preferred embodiment.

In FIG. 1, a display device 10 includes a light box 11, the inside surfaces of which have very highly and diffusely reflectivities. Light sources, such as 12a and 12b, are arranged along two of the edges of the light box 11 and provide the back illumination needed for the screen of the display device. The light sources 12a and 12b preferably are tubular and extend the full length of the light box 11 substantially parallel to the sides of the light box. However, different types of light sources can also be used. A reflector 13 is included in the light box 11 and also has a highly and diffusely reflective surface. As described hereinafter with respect to FIGS. 2, 3 and 5, the reflector 13 includes a plurality of slots, or apertures, which transmit light from the light box 11 to the viewing screen of the display device 10. A lens 14, which is described in detail hereinafter with respect to FIGS. 2, 3 and 6, is supported by the reflector 13, and can be integral with the reflector. A plurality of liquid crystal cells (pixel elements) 16R, 16G and 16B are supported by the lens 14. Each pixel of the display screen includes one of each of the cells 16R, 16G, 16B. Details of the pixel elements 16R, 16G, 16B are presented hereinafter with respect to FIGS. 4 and 5.

Figure 7:
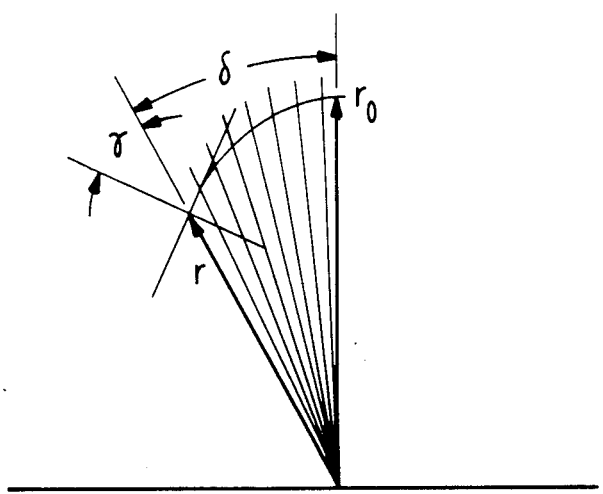
FIG. 7 is useful in understanding how the cross sectional configuration of the elongated lenslets is selected.

In FIG. 2, the lens 14 is a lenticular lens array formed of a plurality of longitudinal lenslets 17 which are arranged juxtaposed and formed into an integral unit having a smooth surface 18. The lens 14 can be made of glass or preferably of molded plastic. The reflector 13 is affixed to the smooth surface 18 and includes a plurality of slots 19 having a width S. The slots 19 are centered about the optical axes 21 of the lenslets 17. The lens 14 has an index of refraction n which, as described hereinafter with respect to FIG. 7, is instrumental in determining the cross sectional configuration of the lenslets 17. The depth H of the light box 11 is large with respect to the width S of the slots 19. Also, the internal surfaces of the light box 11, including the surface of reflector 13 which faces light box 11, are highly and diffusely reflective. Accordingly, a relatively uniform light intensity with approximate random directional distribution is obtained throughout the lightbox 11, and each of the slots 19 transmits substantially the same intensity of light. The light sources 12a and 12b are arranged outside the area of the lens 14 to enhance the uniformity of light provided to the slots 19.

FIG. 2 shows light rays 22a through 22i, in the plane of the FIGURE, from a number of random directions representative of random light within the light box 11. As the light rays pass through the slots 19, they change directions relative to the normal surface 18 of the lens 14. The relationship between the angles $\theta$ and $\phi$ from the normal for a material having an index of refraction n is given by Snell's Law. Approximating the index of refraction of air as unity the angular relationship is:

$$\sin(\theta) = n \sin(\phi).$$

Letting the angle $\theta$ have a maximum value of 90° yields the maximum angle $\theta$ of:

$$\theta \max = \arcsin(1/n). \qquad (1)$$

From equation (1) it can be calculated that all the light passing through the slots 19 into the lens 14 is confined within the angles $+/-\theta$ max inside the material of which the lens 14 is composed. As an example, if the lens 14 is composed of polycarbonate, which has a reflective index of 1.6 the maximum internal angles become $\pm 38.7°$. The slots 19 are narrow compared to the thickness t of the lens 14 and, accordingly, light exiting upwardly from the smooth surface 18 is confined between the correspondingly narrow pair of angles $+/-\alpha$. Again using polycarbonate as an example, and taking the slot width S to be 12% of the thickness t, extreme rays from the slot edges will pass through the center of the lens 14 at an internal angle $\beta$ of about $\pm 4.1°$. The external angle $\alpha$ for the same rays leaving the lens 14 is increased according to Snell's Law and becomes about $\pm 6.60°$. This angular spread is well within the needs of liquid crystal display systems in the narrow direction of the crystals.

In FIG. 3, the slots 19 are displaced from the surface 18 of the lens 14 into the light box 11. The slots 19 are again centered on the optical axes 21 of the lenslets 17. The edges 23 of the slots 19 are disposed at an angle $\gamma$ with respect to the optical axis 21 of the lenslets 17. The construction of the lens 14 shown in FIG. 3 permits all the crucial dimensional relationships between the slots 19 on one side of the lens and the lenslets 17 on the other side of the lens to be established during the forming of the lens. For example, hot pressing, or molding methods, can be used to form both sides of the lens 14 simultaneously.

In the FIG. 3 embodiment, reflector 13 is formed by depositing a highly and diffusely reflective material onto the surface 18 between the slots 19. During the deposition process it is possible that the reflective material will also coat the slots 19. If this occurs, the reflective material can easily be removed from the slots 19 by abrasion or polishing methods. Advantageously, the slots 19 are accurately positioned with respect to the optical axis 21 of the lenslet 17 using low-cost, well-known fabrication techniques.

Figure 4:
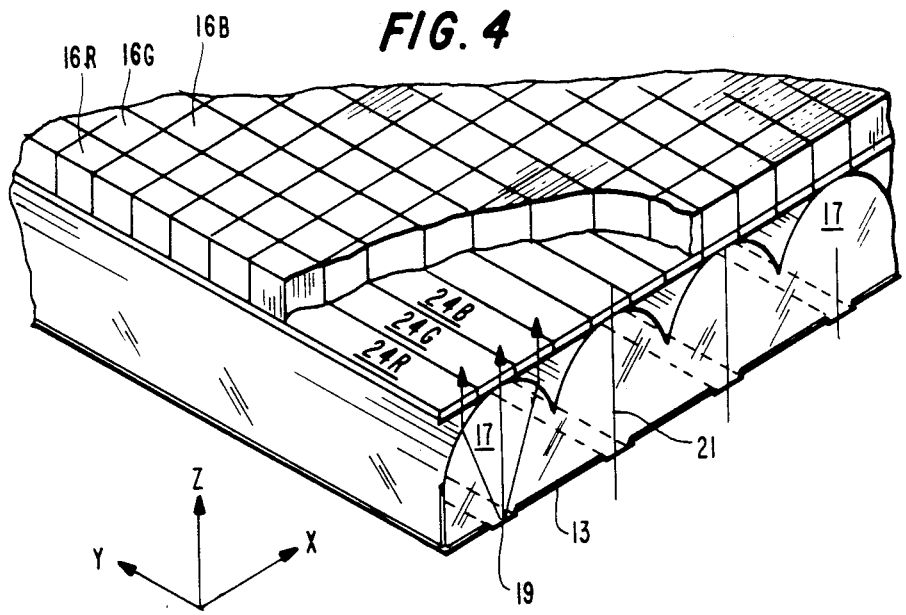
FIG. 4 shows the relationship of the elongated lenslets, the color filters, and the pixel elements for the preferred embodiments of FIGS. 2 and 3.

In FIG. 4, red, green and blue filters 24R, 24G and 24B, respectively, are arranged between each of the lenslets 17 and the liquid crystal cells (pixel elements) 16R, 16G, 16B. The filters 24R, 24G, 24B can be either absorptive or interference filters. Accordingly, in the FIG. 4 embodiment, each of the lenslets 17 provides partially collimated light, that is light confined within a narrow transverse angle, for each pixel composed of a triad of pixel elements 16R, 16G and 16B. Components of the light, obtained by projecting the exiting rays onto the x-z plane, are partially collimated within the range of angles $+\alpha$ to $-\alpha$. Components of the light in the orthogonal direction, obtained by projecting the exiting rays onto the y-z plane, are not subject to collimation by the elongated cylindrical lenslets 17.

Figure 5:
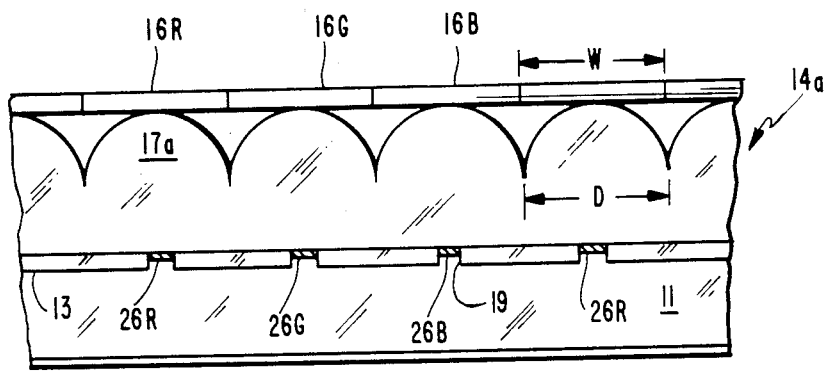
FIG. 5 is a portion of a third preferred embodiment.
Figure 6:
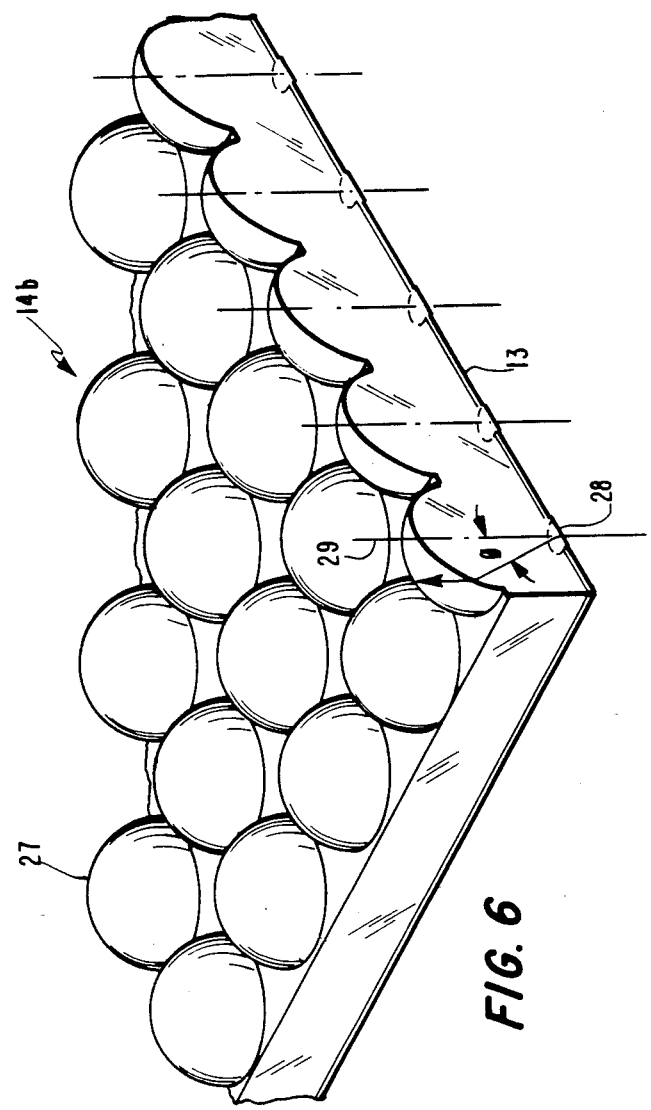
FIG. 6 is a portion of a fourth preferred embodiment.

FIG. 5 is an embodiment which permits elimination of the filters 24R, 24G and 24B of FIG. 4. Dielectric film interference filters 26R, 26G and 26B are sequentially arranged in the slots 19. The interference filter 26R transmits red light to the lens 14a and reflects green and blue light back into lightbox 11. Similarly, interference filter 26G transmits green light to the lens 14a and reflects red and blue light back into the lightbox 11. Interference filter 26B transmits blue light and reflects red and green light. The interference filters 26R, 26G and 26B are arranged in a repetitive pattern along an axis extending perpendicular to the longitudinal axis of the lenslets 17a. The interference filters 26R, 26G and 26B are longitudinal and extend the full length of the lenslets 17a and the slots 19. The lenslets 17a have a diameter D which is substantially equal to the width W of the pixel elements 16R, 16G and 16B. Accordingly, each lenslet 17a provides partially collimated light to the pixel elements for one primary light color. This is different from the embodiment of FIG. 4 where each of the lenslets 17 provides collimated light to three pixel elements. Because the interference filters 26R, 26B and 26G transmit only one color of light a significantly higher light output to the screen is achieved because the unselected colors are reflected back into the light box 11 and eventually exit from a slot associated with a filter having the proper light transmission capability, after a slight absorption because of the additional reflections within the light box 11.

In the embodiments described with respect to FIGS. 2 to 5, the lenslets 17 and 17a are elongated cylinders having a constant cross-sectional configuration and, accordingly, confine light in only one direction. FIG. 6 is an embodiment which confines light in orthogonal directions, concentrating the light close to the axes of the lenses. In the FIG. 6 embodiment, the lenslets 17 and 17a of the other embodiments are replaced by spherical lenslets 27 arranged in a matrix parallel to the horizontal and vertical axes of the viewing screen. Circular apertures 28 are centered with the central and optical axes 29 of the lenslets 27. The radii of the apertures 28 are limited by the same off axis light ray considerations that limit the slots widths in the previous embodiments. Consequently, the maximum aperture diameters are equal to the maximum slot widths for any particular thickness of the lens 14b. Because the apertures 28 constitute a much smaller fraction of the total area of the walls of the light box 11 than the slots 19 in the other embodiments, the required light intensity within the light box 11 for a given transmitted light flux at the screen is greater for the circular aperture embodiment then for the slotted embodiments. For similar reasons, because the light undergoes a greater average number of wall reflections before escaping through a circular aperture, the absorptive loss in the light box is therefore larger for the circular aperture configuration.

FIG. 7 shows a representative lens profile for a lens material having a refractive index of 1.6, which is the index of polycarbonate, a preferred material for the lenses 14, 14a and 14b. The origin of the coordinate system is taken on the optical axis at the surface 18 of the lens and at the center of slot 19. FIG. 7 shows the radii r and $r_o$ of the lens at various angles from the optical axis 21. The profile is not complicated and dies having a multiplicity of parallel grooves with the appropriate contour can easily be fabricated to form the lens 14 by either hot pressing or by molding.

Letting the angle between the tangent to the lens and a line through the origin be represented by $\gamma$, as shown in FIG. 7, and letting $r_o$ represent the thickness of the lens along the optical axis, the lens contour is given by the equation:

$$r = r_o e^{-\int_0^\delta tan(\gamma)d\delta} \qquad (2)$$

where the relationship between the angle, $\gamma$, and the internal refractive angle, $\delta$, is given by:

$$\delta = \arcsin(n\sin(\gamma)) - \gamma. \qquad (3)$$

Equations (2) and (3) are solved by a simple ellipse of the form:

$$r = r_o(n-1)/(n-\cos(\delta)) \qquad (4)$$

where the eccentricity of the ellipse in $1/n$.

This contour formula is rigorously correct only for very narrow slots. However, since the liquid crystal cells can tolerate off-axis light ray directions up to approximately 15 degrees, these formulas are applicable for slot widths up to approximately 12 percent of the lens thickness t, as was used in the above example. The cross-sectional configuration of the lenslets 17 and 17a therefore is that of an ellipse. However, a circular profile is a special case of an elliptical profile and is an acceptable configuration for the lenslets. Other lens profiles are also acceptable; for example, a parabolic or a hyperbolic profile can be used depending upon the angular concentration requirements. Accordingly, as used herein, the term "generally elliptical" is to be construed as encompassing any curved profile which concentrates the light rays onto the pixel elements.

What is claimed is:

1. An illumination system for a display device having a plurality of pixels arranged in rows and columns substantially parallel to the axes of said display device comprising:

a plurality of juxtaposed elongated lenslets having a generally elliptical cross section arranged substantially parallel to one of said axes for providing light, partially collimated along one of said axes to said pixels;

a light box for providing uncollimated light to said lenslets, said light box being internally highly and diffusively reflective, said light box housing at least one light source arranged in the proximity of one edge of said light box, said light box having a light opaque reflector coincident with said lenslets, said reflector including a plurality of elongated light transmissive slots having a width substantially less than the width of said lenslets, and arranged substantially parallel to said lenslets, and centered with respect to said lenslets for individually transmitting uncollimated light from said light box to said lenslets; and first, second and third interference filters sequentially arranged in said slots in a repetitive pattern, said first filters transmitting the first primary light color and reflecting the second and third primary light colors back into said box, said second filters transmitting the second primary light color and reflecting the other two primary light colors back into said box, and said third filters transmitting the third primary light color and reflecting the outer two primary light colors back into said box.

2. The illumination system of claim 1 wherein said lenslets are an integral lenticular lens having a smooth surface facing said light box, and wherein said reflector is permanently affixed to said smooth surface.

3. The illumination system of claim 2 wherein said slots are displaced from said smooth surface.

4. The illumination system of claim 3 wherein the width of said slots is less than approximately 15% of the thickness of said lenslets, as measured along the optical axis of said lenslets.

5. The illumination system of claim 4 wherein each of said pixels is composed of a plurality of pixel elements, and wherein the width of said lenslets is substantially equal to the width of said pixel elements.

6. The illumination system of claim 5 wherein said light source includes at least one elongated tube arranged substantially parallel to the edge of said light box and outside the area of said lenticular lens.

7. The illumination system of claim 1 wherein each of said pixels is composed of a plurality of pixel elements, and wherein the width of said lenslets is substantially equal to the width of said pixel elements.

8. The illumination system of claim 7 wherein said lenslets are an integral lenticular lens having a smooth surface facing said light box, and wherein said slots are displaced form said smooth surface.

9. The illumination system of claim 8 wherein the width of said slots is less than approximately 15% of the thickness of said lenslets, as measured along the optical axis of said lenslets.

10. An illumination system for a display device having a matrix of pixel elements arranged in rows and columns substantially parallel to the axes of said display device comprising:

a matrix of substantially circular lenses aligned with said pixel elements for providing partially collimated light to said pixel elements;

a light box for providing uncollimated light to said lenses, said light box being internally highly and diffusively reflective, said light box housing at least one light source arranged in the proximity of one edge of said light box, said light box having a light opaque reflector coincident with said lenses, said reflector including a matrix of light transmissive apertures centered with respect to said lenses for individually transmitting uncollimated light from said light box to said lenses; said apertures having a radius substantially less than the radius of said lenses; and first, second and third interference filters sequentially arranged in said apertures in a repetitive pattern, said first filters transmitting the first primary light color and reflecting the second and third primary light colors back into said box, said second filter transmitting the second primary light color and reflecting the other two primary light colors back into said box, and said third filters transmitting the third primary light color and reflecting the other two primary light colors back into said box.

11. The illumination system of claim 10 wherein said circular lenses form an integral lens having a smooth surface facing said light box and wherein said reflector is permanently affixed to said smooth surface.

12. The illumination system of claim 11 wherein said apertures are displaced from said smooth surface.

13. The illumination system of claim 12 wherein the radius of said apertures is less than approximately 15% of the radius of said lenses.

14. The illumination system of claim 13 wherein said light source includes at least one elongated tube arranged substantially parallel to the edge of said light box and outside the area of said lens.

15. An illumination system for a display device having a plurality of pixels arranged in rows and columns substantially parallel to the axes of said display device comprising:
   a plurality of juxtaposed elongated lenslets having a smooth surface and a width substantially equal to the width of said pixels and a generally elliptical cross section arranged substantially parallel to one of said axes for providing light, partially collimated along one of said axes to said pixels;
   a light box for providing uncollimated light to said lenslets, said light box being internally highly and diffusely reflective, said light box housing at least one light source arranged in the proximity of one edge of said light box, said light box having a light opaque reflector coincident with said smooth surface of said lenslets, said reflector including a plurality of elongated light transmissive slots having a width substantially less than the width of said lenslets and arranged substantially parallel to said lenslets and centered with respect to said lenslets for individually transmitting uncollimated light from said light box to said lenslets, said lenslets said light box, and said slots being displaced from said smooth surface.

16. The illumination system of claim 15 wherein the width of said slots is less than approximately 15% of the thickness of said lenslets, as measured along the optical axis of said lenslets.

17. An illumination system for a display device having a plurality of pixels arranged in rows and columns substantially parallel to the axes of said display device comprising:
   a plurality of juxtaposed elongated lenslets having a generally elliptical cross section arranged substantially parallel to one of said axes for providing light, partially collimated along one of said axes to said pixels;
   a light box for providing uncollimated light to said lenslets, said light box being internally highly and diffusely reflective, said light box housing at least one light source arranged in the proximity of one edge of said light box, said light box having a light opaque reflector coincident with said lenslets, said reflector including a plurality of elongated light transmissive slots arranged substantially parallel to said lenslets and centered with respect to said lenslets for individually transmitting uncollimated light form said light box to said lenslets; and.
   first, second and third filters sequentially arranged in said slots in a repetitive patternm said first, second and third filters transmitting only the first, second and third primary light colors, respectively.

18. An illumination system for a display device having a plurality of pixels arranged in rows and columns substantially parallel to the axes of said display device comprising:
   a plurality of juxtaposed elongated lenslets having a generally elliptical cross section arranged substantially parallel to one of said axes for providing light, partially collimated along one of said axes to said pixels;
   a light box for providing uncollimated light to said lenslets, said light box being internally highly and diffusely reflective, said light box housing at least one light source arranged in the proximity of one edge of said light box, said light box having a light opaque reflector coincident with said lenslets, said reflector including a plurality of elongated light transmissive slots arranged substantially parallel to said lenslets and centered with respect to said lenslets for individually transmitting uncollimated light from said light box to said lenslets, said lenslets being an integral lenticular lens having a smooth surface facing said light box, said reflector being permanently affixed to said smooth surface, and said slots being displaced from said smooth surface.

* * * * *